2,972,569

HORTESIN, AN ANTIFUNGAL AGENT DERIVED FROM STREPTOMYCES VERSIPELLIS

Thomas J. Oliver, Zion, Joseph F. Prokop, Mundelein, Arthur C. Sinclair, Lake Bluff, Halleck B. Warren, Jr., Greenville, and Arnold F. Winfield, Evanston, Ill., assignors to Abbott Laboratories, North Chicago, Ill., a corporation of Illinois No Drawing. Filed Mar. 21, 1960, Ser. No. 16,192

8 Claims. (Cl. 195—80)

This invention relates to a new composition of matter and more particularly to a new plant antifugal agent designated as hortesin derived from *Streptomyces versipellis* and to a method of producing said agent.

There has been increasing use of chemical agents for the control and prevention of diseases which affect plants, trees, and agricultural crops. It is therefore an object of the present invention to provide an improved composition of matter for the treatment of plants, trees, and agricultural crops to control the growth of fungi and a method of producing said composition. Other objects of the invention and uses of the said composition will be apparent from the specification and claims to follow.

The novel composition of the present invention, herein identified as hortesin, is produced by growing the microorganism, *Streptomyces versipellis*, under controlled aerobic conditions in a deep culture fermentation process with a nutrient medium containing a utilizable source of carbon, nitrogen, and the usual essential trace minerals normally present in the natural sources of carbon and nitrogen.

The parent culture of *Streptomyces versipellis* was isolated from a soil sample taken from a sweet potato patch, Wauxahatchie, Ellis County, Texas. The isolation was carried out by standard dilution procedures employing a culture medium which is selective for actinomycetes.

The organism *Streptomyces versipellis* is a new species of microorganism not heretofore known and is a member of the genus Streptomyces according to the classification in Bergey's Manual of Determinative Bacteriology (6th ed.). A careful study of the morphology and physiology of the organism *Streptomyces versipellis* shows it to be distinctly different from any known species of Streptomyces and therefore the organism of the present invention is a new species of Streptomyces. The term "versipellis" means that the organism changes its skin, shape or form thus altering its appearance.

From a study of the characteristics of the Streptomyces species contained in Bergey's Manual of Determinative Bacteriology (6th ed.), 1948, and in Guide to the Identification of the Actinomycetes and Their Antibiotics, Waksman and Lechevalier, 1953, the species selected as most closely resembling the culture of the present invention is *Streptomyces bikiniensis*.

In order to compare the organism *Streptomyces bikiniensis* with *Streptomyces versipellis*, a culture of *Streptomyces bikiniensis* was grown under the conditions herein described for *Streptomyces versipellis* and the following characteristics shown in Table 1 were observed:

TABLE 1

| *Streptomyces versipellis* | *Streptomyces bikiniensis* |
|---|---|
| Spores—oval to round, born in coils or spirals. | Spores—oval, born in straight chains, without spirals. |
| Glucose agar—aerial mycelium absent. | Glucose agar—aerial mycelium abundant, gray. |
| Starch agar—marked hydrolysis, abundant growth. | Starch agar—slight hydrolysis, abundant growth. |
| Glucose-asparagine agar—abundant growth, sparse patchy white aerial, no soluble pigment. | Glucose-asparagine agar—abundant growth and mouse gray aerial mycelium, amber soluble pigment. |
| Carbon sources: (1) Following carbon sources utilized among others: mannitol, raffinose, sucrose, fructose, inositol. (2) Utilized but not within five days: sodium salts of citric, acetic, and succinic acids. | Carbon sources: (1) Did not utilize mannitol, raffinose, sucrose, fructose, inositol. (2) Utilized rapidly or within three to five days: sodium salts of citric, acetic, and succinic acids. |
| Deep Culture Fermentation: (1) Produces the antifungal agent hortesin. (2) Does not produce the antibiotic streptomycin. | Deep Culture Fermentation: (1) Does not produce the antifungal agent hortesin. (2) Produces the antibiotic streptomycin. |

Classification of the organism *Streptomyces versipellis* as a new species distinct from the most closely related species *Streptomyces bikiniensis* is further confirmed by the authority "A Guide to the Classification of Streptomycetes According to Selected Groups," T. G. Pridham, C. W. Hesseltine, and R. G. Benedict, Applied Microbiology, vol. 6, No. 1, January 1958, pages 52–79, wherein *Streptomyces bikiniensis* is classified in section "Rectus-Flexibilis, Yellow Series." *Streptomyces versipellis*, however, must be classified under section "Spira, Grey Series."

A culture of *Streptomyces versipellis* has been deposited in the permanent culture collection of the Culture Collection Unit, Northern Utilization Research Branch, Agricultural Research Service, United States Department of Agriculture, Peoria, Illinois, under the number NRRL 2528.

The parent culture, on certain of the standard media disclosed herein, forms colonies having aerial mycelium and other colonies which do not have aerial mycelium, and the aerial mycelium producing subisolates thereof exhibit a monopodial-type branching structure of the aerial mycelium. Spores arise in loose spirals at the ends of branches from the primary mycelium and only occasionally from branches of secondary mycelium. The oval spores measure 1.0 micron in length by 0.9 micron in width. There is no evidence of whorls in the mycelium. The colonies having aerial mycelium and those which do not have aerial mycelium have the same physiological characteristics, such as the utilization of carbohydrates, and the same growth characteristics on the standard media, except for the absence of aerial mycelium.

For optimum production of antifungal activity under the conditions set forth herein, the organism *Streptomyces versipellis* should be maintained in the asporogenous state. This can be done by selecting non-sporulating colonies from growth in petri dishes. Stock cultures are maintained in the lyophilized condition or as soil stocks.

The said organism producing the antifungal agent of the present invention exhibits the following cultural characteristics when grown on the following standard media:

(A) Tryptone, beef extract, yeast extract, dextrose agar—Abundant growth, dull, flatly convex circular colonies 4 to 5 mm. in diameter, entire edges becoming dented on top in 5 to 7 days incubation at 28° C., clove brown substratal mycelium (dark 3 pl), no aerial mycelium, no spores, dark brown water soluble pigment;

(B) Peptone, beef extract, dextrose, sodium chloride agar—Abundant growth, smooth circular low convex colonies, entire edges becoming slightly dentate in 5 to 7 days at 28° C., early dull colony surface becoming shiny, colony size 4 to 6 mm., substratal mycelium mustard tan (2 ie–2 ig), no aerial mycelium or spores, light brown to brown soluble pigment;

(C) Carvajal Oatmeal agar—Moderate to abundant growth, early growth of circular, flat, smooth colonies with entire edges becoming dentate at spreading edges in 5 to 7 days at 28° C., colonies remain dull spreading in size to 8 to 10 mm. diameter in 9 to 14 days, substratal mycelium yellow (1½ ec) becoming bamboo (gray 2 gc) after two weeks, patchy gray aerial mycelium develops on some colonies after three weeks' incubation;

(D) Beef extract, peptone, glucose agar (glucose agar)—Moderate to abundant growth, smooth, circular, shiny convex colonies at 48 hours 28° C. becoming slightly irregular in 5 to 7 days, the still shiny surface dented from center to edge, substratal mycelium bamboo (2 gc) at 48 hours becoming mustard (2 le) in 5 days, light brown soluble pigment, no aerial mycelium or spores;

(E) Dextrose-Asparagine agar—Moderate growth, dull flatly convex colonies, substratal mycelium putty (light 1½ ec), very sparse patchy white aerial develops in three weeks at 28° C., no spores, no soluble pigment, edges of colonies irregular and fuzzy in 9 to 14 days;

(F) Czapek-Dox (Dextrose) agar—Light growth cream substratal becoming putty (1½ ec) after two weeks 28° C., colonies smooth circular shiny to shiny-dull with entire edges, no aerial mycelium, spores, or soluble pigment;

(G) Calcium-Malate agar—Moderate growth, circular smooth flat colonies becoming irregular and fuzzy at the edges, surface dull, substratal mycelium light putty (1½ ec), a few colonies develop fine white aerial visible by microscopic examination containing occasional loose coils of spores containing from 3 to 5 turns, no pigment is formed, digestion extends 4 to 6 mm. from edge of growth after two weeks' incubation;

(H) Starch, yeast extract, dextrose, ammonium nitrate agar—Moderate growth, substratal mycelium putty (1½ ec), no aerial mycelium spores or pigment, starch is hydrolyzed;

(I) Tryptone blood agar base—Moderate growth, black substratal mycelium, black soluble pigment, growth dull to shiny, no aerial mycelium or spores, blood hemolyzed after two weeks' incubation;

(J) Litmus Milk.—Moderately abundant growth with moderate surface ring covert tan (2 gc) becoming beige brown (3 ig), fine white aerial mycelium develops after three weeks' incubation, no spores, no clot is formed, reaction slightly acid after three weeks, hydrolysis (clearing) begins in two weeks and is complete in three weeks with complete blackening of medium;

(K) Plain Gelatin—Moderate surface growth, olive gray (1½ ig), stratiform liquefaction, dark brown soluble pigment;

(L) Potato Plug—Abundant shiny growth putty (1½ ec) becoming covert tan (2 gc), blackening of plug begins early becoming completely black within three weeks, no aerial mycelium or spores are produced;

(M) Nitrate agar—Thin to moderate cream-white shiny growth, test for nitrite positive, no mycelium, spores or soluble pigment produced;

(N) Glucose Broth—Floccose to flaky growth, dark brown soluble pigment, no aerial mycelium or spores produced from surface growth.

The color code references used herein in describing the growth characteristics of the said culture are in accordance with the Color Harmony Manual, 3rd ed., Jacobsen, R.; Granville, W. C.; and Foss, C. E.; 1948, Container Corporation of America.

The ability of *Streptomyces versipellis* to utilize various commercially available sources of carbon is indicated in the following Table 2:

TABLE 2
*Utilization of carbon*

|  | Carbon Source | Utilization | Rate of Growth |
|---|---|---|---|
| Pentoses | Xylose | + | Moderate. |
|  | Arabinose | + | Rapid. |
|  | Rhamnose | + | Moderate. |
| Hexoses | Dextrose | + | Rapid. |
|  | Galactose | + | Moderate. |
|  | Mannose | + | Do. |
| Ketoses | Fructose | + | Rapid. |
|  | Sorbose | + |  |
| Di-Saccharides | Sucrose | + | Do. |
|  | Lactose | + | Do. |
|  | Maltose | + | Moderate. |
|  | Cellibiose | + | Rapid. |
| Tri-Saccharide | Rafinose | + | Moderate. |
| Poly-Saccharide | Soluble Starch | + | Do. |
|  | Cellulose | − |  |
| Glucoside | Salicin | + | Slow to Moderate. |
| Alcohols | Glycerol | + | Rapid. |
|  | Mannitol | + | Moderate. |
|  | Dulcitol | − |  |
|  | Inositol | + | Do. |
|  | Sorbitol | + |  |
| Acids | Sodium Citrate | + | Slow. |
|  | Sodium Lactate | − |  |
|  | Sodium Succinate | + | Do. |
|  | Sodium Acetate | + | Do. |
|  | Sodium Potassium Tartrate | − |  |
|  | Control (no carbon source) | − |  |

The tests for carbon utilization were carried out according to the procedures of T. G. Pridham and D. Gottlieb, The Utility of Carbon Compounds by Some Actinomycetales As An Aid To Species Determination, "Journal of Bacteriology," 56, 107–114 (1948).

The organism *Streptomyces versipellis* is capable of growing over a temperature range of 20° C. or less, up to 45° C., but not effectively at 50° C. and above. The growth of the said *Streptomyces versipellis* culture at 24°, 28°, 32°, 37°, and 45° C., is described in the following Table 3. The medium employed was a modification of Bennet's medium in which the glucose therein was replaced with an equal amount of dextrin:

TABLE 3
GROWTH CHARACTERISTICS OF *STREPTOMYCES VERSIPELLIS* AT VARIOUS TEMPERATURES

|  | Two Days | Seven Days |
|---|---|---|
| 24° C.: |  |  |
| Growth | Moderate | Abundant. |
| Substratal Mycelium | Beige brown (3 ig) | Dark brown (3 nl). |
| Aerial Mycelium | None | Occasional. |
| Spores | do | None. |
| Soluble Pigment | Gray | Dark gray. |
| 28° C.: |  |  |
| Growth | Abundant | Abundant. |
| Substratal Mycelium | Beaver (3 li) | Dark brown (3 nl). |
| Aerial Mycelium | None | Moderate (patchy). |
| Spores | do | Dark gray. |
| Soluble Pigment | Gray | Do. |
| 32° C.: |  |  |
| Growth | Abundant | Abundant. |
| Substratal Mycelium | Beaver (3 li) | Dark brown (3 nl). |
| Aerial Mycelium | None | Abundant gray White. |
| Spores | do | Moderate gray. |
| Soluble Pigment | Gray | Medium dark gray. |
| 37° C.: |  |  |
| Growth | Abundant | Abundant. |
| Substratal Mycelium | Convert tan (2 ge) | Beige (3 ge). |
| Aerial Mycelium | None | None. |
| Spores | do | Do. |
| Soluble Pigment | Light gray | Light gray. |
| 45° C.: |  |  |
| Moderate growth, cream substratal, no aerial, spores or soluble pigment, growth ceased to progress after five days. |  |  |
| 50° C.: |  |  |
| No growth |  |  |

The activity of the fermentation beers and of the solid preparations is determined by an agar dilution procedure.

Soil stocks of *Alternaria solani* are used to inoculate slants of dextrose-peptone agar which are incubated at 28° C. for 5 to 9 days. The growth from a slant is lightly scraped into 5.0 ml. of sterile deionized water. The mycelium suspension thus formed is drawn off and 10.0 ml. of sterile water is added to suspend additional mycelium by agitation. The combined suspensions, made up to a final volume of 20.0 ml. with sterile water, are allowed to settle briefly and the portion exclusive of large particles which settle out is used for the inoculum in the agar dilution assay.

The agar medium used for the assay consists of tryptone 3.0 grams, beef extract 3.0 grams, dextrose 1.0 gram, yeast extract 1.0 gram, $KH_2PO_4$ 1.0 gram, $K_2HPO_4$ 3.0 grams, agar 20.0 grams, and deionized water 1.0 liter. The medium is steam sterilized under 15 p.s.i., 250° F., for a period depending on the volume to be sterilized. The agar medium is then cooled to approximately 50° C. for use.

The agar dilution assay can be done in glass petri dishes or other suitable containers, such as aluminum muffin tins. An aliquot (2.0 ml.) of the solution to be assayed is first added to 2.0 ml. of a solution consisting of equal volumes of acetone and methanol. This is allowed to stand for about five minutes, then a 2.0 ml. aliquot thereof is added to 2.0 ml. of sterile deionized water. This is mixed and a 2.0 ml. aliquot is added to 2.0 ml. of sterile water. This process is repeated for the required number of dilutions depending upon expected activity. Each plate contains 2.0 ml. of a solution of the antibiotic, each containing half the concentration as contained in the preceding plate. An 0.5 ml. aliquot of a 200 mcg./ml. solution of oxytetracycline HCl. is then added to each plate to prevent growth of chance bacterial contaminants and of the *Streptomyces versipellis* which may be in some samples, such as the fermentation liquors. This amount of oxytetracycline has no inhibiting effect on growth of the test organism *Alternaria solani.* The agar medium (8.0 ml.) is then added to each plate, mixed with the antibiotic solution contained therein, and allowed to gel. After gelling, the agar surface is streaked by pipette or wire inoculating loop with the aforementioned mycelial suspension of *Alternaria solani.* The plates are covered and incubated at 28° C. for 48 hours. The final dilution of the antibiotic solution just inhibiting growth of *Alternaria solani* is taken as the potency or activity of the solution being assayed.

The invivo activity of the antifungal agent was determined by its ability to protect tomato plants, "Bonny Best" variety, from early blight caused by the fungus *Alternaria solani.* A filtrate of a beer produced as described herein or a solid preparation recovered from the said beer as shown herein was dissolved in water or was incorporated in the specified proportions into a standard water-base plant spray vehicle containing between 50 and 250 parts per million of a commercial wetting agent, such as "Triton X-155" which is an alkyl phenol-ethylene oxide condensation product produced by the Rohm and Haas Company, U.S.A. The said tomato plants, when about 4 to 6 inches high, were sprayed with the said antifungal composition and the plants allowed to dry. Spores of *Alternaria solani* were sprayed on the plants, the plants were held in a moist chamber having a moisture-saturated atmosphere at 70° F. to allow the fungus spores to germinate and then held in a shaded greenhouse to allow the lesions to develop. The number of the lesions on 3 leaves of each plant were counted. The score of the treated plants was determined by the percentage reduction in its number of lesions on the treated plants as compared with the controls. For example, control plants—300 lesions; treated plants—3 lesions; the score is 99% protection.

Suitable sources of carbon for the fermentation process include sugars, such as glucose, fructose, sucrose, and lactose; crude sugars, such as molasses or brown sugar; sugar alcohols, such as glycerol and mannitol; polysaccharides, such as starch and dextrin; and vegetable oils and animal oils, such as soybean oil and lard oil, respectively. Suitable sources of nitrogen include a variety of peptones, corn steep and soybean meal, as well as the usual inorganic forms of nitrogen.

The preferred temperature of the fermentation process is 28° to 35° C., although temperatures as low as 24° C. and as high as 37° C. can be used. Good yields can be obtained in about 3 days of fermentation with the temperature at about 32° C.

The following specific examples are presented only for the purpose of illustrating the present invention and are not to be construed as limiting the invention to the specific proportions and materials specified.

EXAMPLE 1

The vegetative inoculum for the deep fermentor was prepared by streaking a soil stock of *Streptomyces versipellis* on an agar slant of the following composition:

| | Percent |
|---|---|
| Yeast extract | 0.5 |
| Tryptone | 0.5 |
| Glucose | 0.5 |
| Agar | 2.0 |
| Tap water q.s. 100 ml. | |

The slant was incubated at 28° C. for about 5 days. Sterile water was added to the slant, the growth was scraped off and the suspended growth from the slant was pipetted into a 500 ml. Erlenmeyer flask containing 150 ml. of sterile medium consisting of:

| | Percent |
|---|---|
| Soybean meal | 1.5 |
| Glucose | 1.5 |
| NaCl | 0.5 |
| $CaCO_3$ | 0.1 |
| Tap water q.s. 150 ml. | |

The inoculated flask was incubated on a Gump rotary shaker operating at 240 r.p.m. through an eccentric of 2¼ inches with an incubation temperature of 28° C. After 48 hours, the desired number of flasks of the same medium are inoculated with 4% by volume of the growth from the above flask and incubated another 48 hours. A 4% volume of this vegetative growth serves as the inocula for the 30-liter fermentors. Aseptic procedure was used throughout the process.

A 30-liter fermentor was filled with 12 liters of a medium having the following composition by weight:

| | Percent |
|---|---|
| Dextrin | 2.0 |
| $K_2HPO_4$ | 0.2 |
| $KH_2PO_4$ | 0.1 |
| $MgSO_4.7H_2O$ | 0.2 |
| NaCl | 0.2 |
| $(NH_4)_2HPO_4$ | 0.3 |
| $CuSO_4.5H_2O$ | 0.00065 |
| $FeSO_4.7H_2O$ | 0.00111 |
| $ZnSO_4.7H_2O$ | 0.0115 |
| $MnCl_2.4H_2O$ | 0.0007 |
| Peptone | 2.0 |
| Tap water q.s. 12 liters. | |

The fermentor was sterilized and inoculated with 4% by volume of the said vegetative inoculum after adjusting to pH 6.5–6.7 by the addition of sodium carbonate, and the 30-liter fermentor was incubated in a constant temperature water bath at 28° C. Sterile air was bubbled through the medium at a rate of about 0.83 liter of air per liter of medium per minute. Agitation is supplied by a four-blade impeller revolving at 480 r.p.m.

An antifoaming agent consisting of 60–120 ml. lard oil containing 2.5% octadecanol is added to the fermentor prior to sterilization of the medium and 300 ml.

of lard oil containing 2.5% octadecanol is placed in the reservoir of the automatic antifoaming device. The fermentor containing 12 liters of medium and antifoam is sterilized at 121° C. for one hour. After 4 days of fermentation at about 28° C., a beer having a potency of 10,000 agar dilution units per ml. against *Alternaria solani* was produced. This filtered beer controlled 97% of the tomato early blight infection caused by the fungus *Alternaria solani* on "Bonny Best" variety tomato plants when sprayed on the said plants in the herein above described manner at a dilution of one volume of filtered beer in 100 volumes of an aqueous spray (i.e. a dilution of 1:100). A 1:10 dilution of the filtered beer gave 100% protection of the tomato plants.

EXAMPLE 2

A 30-liter fermentor was filled with 12 liters of a medium containing the following ingredients on a weight basis:

| | Percent |
|---|---|
| Dextrin | 2.0 |
| $K_2HPO_4$ | 0.2 |
| $KH_2PO_4$ | 0.1 |
| $MgSO_4.7H_2O$ | 0.2 |
| NaCl | 0.2 |
| $CuSO_4.5H_2O$ | 0.00065 |
| $FeSO_4.7H_2O$ | 0.00111 |
| $ZnSO_4.7H_2O$ | 0.0115 |
| $MnCl_2.4H_2O$ | 0.0007 |
| Wet corn steep | 2.0 |
| Tap water q.s. 12 liters. | |

The pH was adjusted to 6.5–6.7 by the addition of sodium carbonate and the above procedure described in Example 1 was followed. A typical sample of beer taken from the fermentation on the fourth day assayed 640 agar dilution units per ml. with *Alternaria solani.* A 1:100 dilution of this filtered beer with the aqueous base plant spray vehicle containing Triton X–155 (250 p.p.m.) as the wetting agent controlled 99% of the tomato early blight caused by *Alternaria solani* on the "Bonny Best" variety tomato plants in the greenhouse when applied in the herein above described manner while a 1:10 dilution gave complete protection.

EXAMPLE 3

A 30-liter fermentor was filled with 12 liters of a medium containing the following components on a weight basis:

| | Percent |
|---|---|
| Dextrin | 2.0 |
| Wet corn steep | 2.0 |
| Soybean meal | 2.0 |
| NaCl | 0.5 |
| $CaCO_3$ | 0.2 |
| Tap water q.s. 12 liters. | |

The pH was adjusted to 6.5–6.7 by the addition of sodium carbonate, and the above procedure described in Example 1 was carried out. This fermentor on the fourth day of fermentation yielded 5,000 agar dilution units per ml. against *Alternaria solani.* This filtered beer controlled 97% of the said tomato early blight infection on the said tomato plants in the greenhouse at a dilution of 1:100 with the above plant spray vehicle. A 1:10 dilution netted 100% protection.

EXAMPLE 4

A 30-liter fermentor was filled with 12 liters of a medium having the following constituents by weight:

| | Percent |
|---|---|
| Dextrin | 2.0 |
| Wet corn steep | 3.0 |
| Soybean meal | 1.0 |
| NaCl | 0.5 |
| $CaCO_3$ | 0.2 |
| Tap water q.s. 12 liters. | |

The pH was adjusted to 6.5–6.7 by the addition of sodium carbonate, and the above procedure described in Example 1 was carried out. Beer from the fourth day of this fermentation showed 1,250 agar dilution units against *Alternaria solani.* This filtered beer at dilutions of 1:100 and 1:10 with the above plant spray vehicle gave 98% and 99% protection, respectively, against the said tomato early blight on the tomato plants in the greenhouse.

EXAMPLE 5

A 30-liter fermentor was filled with 12 liters of a medium consisting of the following ingredients by weight:

| | Percent |
|---|---|
| Dextrin | 2.0 |
| $K_2HPO_4$ | 0.2 |
| $KH_2PO_4$ | 0.1 |
| $MgSO_4.7H_2O$ | 0.2 |
| NaCl | 0.2 |
| Peptone | 2.0 |
| $CuSO_4.5H_2O$ | 0.00065 |
| $FeSO_4.7H_2O$ | 0.00111 |
| $ZnSO_4.7H_2O$ | 0.0115 |
| $MnCl_2.4H_2O$ | 0.0007 |
| Tap water q.s. 12 liters. | |

The pH was adjusted to 6.5–6.7 by the addition of sodium carbonate, and the above procedure described in Example 1 was followed. On the fourth day the assay of the beer was 5,000 *Alternaria solani* agar dilution units per ml. A 1:100 dilution of this filtered beer with the above plant spray vehicle suppressed 95% of the said tomato early blight infection on the tomato plants in the greenhouse. A 1:10 dilution of this filtered beer gave 98% protection from the said disease.

EXAMPLE 6

A 30-liter fermentor was filled with 12 liters of a medium having the following composition by weight:

| | Percent |
|---|---|
| Soybean meal | 2.0 |
| Dextrin | 2.0 |
| Wet corn steep | 2.0 |
| NaCl | 0.5 |
| $K_2HPO_4$ | 0.2 |
| $CaCO_3$ | 0.2 |
| Tap water q.s. 12 liters. | |

The pH was adjusted to 6.7 and the deep culture fermentation procedure as described in Example 1 was carried out. This fermentor gave beer on the fourth day of fermentation which assayed 30,000 *Alternaria solani* agar dilution units per ml.

EXAMPLE 7

A 30-liter fermentor was charged with the same medium as in Example 1, except that the soybean meal was increased to 3.0% and the dextrin to 5.0%. The fermentation was conducted under the same conditions as in Example 1, except that the agitation was at a rate of 480 r.p.m. After 90 hours, the beer was harvested with a final pH of 6.8 and an assay of 800 *Alternaria solani* agar dilution units per ml.

EXAMPLE 8

A 30-liter fermentor was charged with 12 liters of medium of the following composition:

| | Percent |
|---|---|
| Dextrin | 2.0 |
| Wet corn steep | 2.0 |
| Peptone | 2.0 |
| Glycerol | 1.0 |
| Sodium acetate | 0.5 |
| $KH_2PO_4$ | 0.1 |
| $K_2HPO_4$ | 0.2 |
| $MgSO_4.7H_2O$ | 0.2 |
| NaCl | 0.2 |
| $CaCO_3$ | 0.2 |

| | Percent |
|---|---|
| $CuSO_4 \cdot 5H_2O$ | 0.00065 |
| $FeSO_4 \cdot 7H_2O$ | 0.00111 |
| $ZnSO_4 \cdot 7H_2O$ | 0.0115 |
| $MnCl_2 \cdot 4H_2O$ | 0.0007 |

Tap water q.s. 12 liters.

Conditions were the same as in Example 1, except that the temperature during the fermentation was maintained at 32° C.

Filtered beer from this fermentation (5.2 liters) was extracted twice with two liter portions of butanol. The first butanol extract was concentrated to 400 ml. under vacuum, and the second extract was likewise concentrated to 260 ml. Both butanol solutions were refrigerated overnight. The precipitates which formed were washed with methanol and dried. From the first butanol extract, 1.14 grams of active material was obtained, and from the second butanol extract, 0.36 gram of active material was obtained. The material from the first butanol extract was used for solubility studies.

If desired, the fermentation liquor or beer can be recovered as a dry solid by filtration and evaporation of the beer to a small volume and finally lyophilizing to give a fairly stable powder which can be stored in closed containers for several months without serious loss of antifungal activity.

Additional antifungal substance can be extracted from the mycelium using mixtures of water with various water miscible solvents. Thus, the mycelium can be extracted with several portions of hot (50° C.) 25-75% aqueous acetone, methanol, ethanol, or n-butanol. The solvent is removed by distillation under reduced pressure. The aqueous solution may then be filtered, if it is turbid, and defatted with hexane or Skellysolve B, after which it is reduced to a small volume and finally lyophilized.

Instead of evaporating and lyophilizing the beer filtrate or the aqueous solution remaining after removal of organic solvent from the mycelium extract, the antifungal substance may be extracted from the water solution into butanol. It can then be precipitated by adding a solvent in which it is insoluble, such as ether, or by drying the butanol and cooling. It can also, of course, be recovered by evaporating the butanol to dryness.

EXAMPLE 9

One hundred fifty ml. of the same medium use in Example 6 were placed in each of 40 Erlenmeyer flasks (500 ml. capacity). After sterilization in an autoclave for 30 minutes at 15 pounds steam pressure and cooling, each flask was inoculated with 5 ml. of the vegetative inoculum produced as described herein. The flasks were incubated for 5 days at 28° C. while held on the said rotary shaker operating at 220-240 r.p.m.

Four and one-half liters of beer from the above shake flask fermentation were filtered and evaporated to dryness to yield 103 grams of solids. This material assayed 40 *Alternaria solani* agar dilution units per mg. On the tomato plants the preparation gave 97% protection against the said tomato early blight infection when it was used in the herein specified manner at a concentration of 100 p.p.m. in the said aqueous base plant spray vehicle.

EXAMPLE 10

The mycelium from the filtration of the beer in Example 9 was extracted with two liters of hot 60% aqueous acetone. The extract was evaporated and freeze dried to yield 19.2 grams of solids. The agar dilution assay with *Alternaria solani* was 200 units per mg. When the material was sprayed on tomato plants in the herein specified manner at a concentration of 10 p.p.m. in the said aqueous spray vehicle, it gave 97% protection against the said tomato early blight.

EXAMPLE 11

The beer from a 30-liter fermentor produced as in Example 6 was mixed with a filter aid and filtered. Two liters of the filtrate were extracted with one liter of butanol. The butanol was evaporated to dryness. The residue was defatted with ether leaving 965 mg. of solids. These solids assayed 2,500 agar dilution units per mg. against *Alternaria solani*. On tomato plants the preparation gave 99% protection against the said tomato early blight when it was used in the herein specified manner at a concentration of 1 p.p.m. in the said aqueous base plant spray vehicle.

EXAMPLE 12

Five liters of filtered beer produced as in Example 8, except that 2.0% soybean meal was used in place of peptone, were extracted twice with four liter portions of n-butanol. The butanol was concentrated to ⅛ volume, by which time the water was removed. The dry butanol solution was chilled overnight and deposited an amorphous precipitate. The precipitate was collected, washed with dry methanol and dried. One-half gram of material was recovered. This preparation assayed 5,000 agar dilution units per mg. against *Alternaria solani*. When this material was sprayed on tomato plants at a concentration of 1 p.p.m. in the said aqueous base plant spray vehicle, it gave 97% protection against the said tomato early blight.

EXAMPLE 13

Fourteen liters of beer produced in accordance with the process of Examples 1 and 7 were mixed with a filter aid and filtration was started. After about three liters of filtrate had been collected, the filtration was so slow that it was stopped. The remaining beer, including the partially formed filter cake, was mixed with an equal volume of acetone, after which it filtered readily. The filter cake was extrated twice with hot 50% aqueous acetone. Over half of the total activity by agar dilution assay was found in the first acetone extract of the mycelium, which measured about nine liters in volume. This extract was evaporated under reduced pressure to a volume of 1.5 liters and was then extracted twice with 800 ml. portions of n-butanol. The combined butanol extracts were evaporated under vacuum to about 150 ml. and stored in the cold room for 2 days. The major portion of the antifungal activity precipitated during this inteval. The supernatant was decanted and the precipitate was washed with methanol, then with ether, and dried to yield 395 mg. of gray powder, assay 36,000 agar dilution units per mg.

By addition of ether to the methanol wash, an additional 80 mg. of similar material was caused to precipitate.

A 216 mg. sample of the purified butanol extract was dissolved in 30 ml. of water and acidified to pH 3.5. A curdy, light tan precipitate formed. The precipitate was collected on a suction filter using a filter aid. The filtrate was neutralized, frozen, and lyophilized to yield 30 mg. of unprecipitated material. The filter cake was washed with 0.05 N sodium hydroxide to redissolve the precipitate. The resulting slightly alkaline (pH 7.5) solution was frozen and lyophilized to yield 107 mg. of solids which assayed about 4,000 units per mg. This decrease in biological potency from the starting material was accompanied by a decrease from 140 to 113 in the extinction $$(E_{1\ cm.}^{1\%})$$

at 267 millimicrons.

The antifungal preparation described in Example 12 was assayed by the above-described agar dilution method against the organisms listed in Table 4 below. Incubation was at 28° C. for the periods indicated. The strain of *Alternaria solani* used in the assay is the strain used to determine the in vivo activity on tomato plants in the greenhouse tests. The inoculum used for Alternaria sp. consisted entirely of spores while the inoculum used for *Alternaria solani* contained no spores and consisted entirely of vegetative mycelial fragments. Other fungi were suspensions in water of mycelial fragments or mixed mycelial fragments and spores. A spore suspension of *Bacillus subtilis* and broth cultures of the other bacteria and yeasts were used to inoculate the assay plates. The results in Table 4 are given in micrograms per milliliter final concentration in agar which completely inhibited growth.

The assay results recorded in Table 4 were obtained by the agar dilution procedure described above with the following exceptions:

(a) The time of reading of the assay plates was 33 hours and 57 hours instead of 48 hours.

(b) The agar medium used for the assay of *Venturia inequalis* did not contain $K_2HPO_4$, $KH_2PO_4$, and oxytetracycline.

(c) The organisms marked (1) were assayed against a solution of the antifungal agent described in Example 12 which was sterilized by filtration through an ultra-fine sintered glass filter and oxytetracycline was not added to the medium. The solution of the antifungal agent used for assaying all other organisms listed in Table 4 was not filtered through a sintered glass filter.

TABLE 4

*Antimicrobial spectrum*

| Organism | Incubation Period—Minimal Inhibitory Concentration | |
|---|---|---|
| | 33 Hours, mcg./ml. | 57 Hours, mcg./ml. |
| *Saccharomyces cerevisiae* NRRL Y44 | 38 | 38 |
| *Candida albicans* ATCC 10231 | *>100 | *>100 |
| *Hansenula californica* NRRL Y1038 | 38 | 38 |
| *Mycoderma vini* NRRL Y94 | *>100 | >100 |
| *Geotrichum* (oidium) *lactis* | 75 | 75 |
| *Myrothecium verrucaria* ATCC 9095 | 75 | *>100 |
| *Chaetomium globosum* ATCC 6205 | 75 | 75 |
| *Fusarium oxysporum* | *>100 | *>100 |
| *Aspergillus niger* ATCC 6277 | 38 | 75 |
| *Trichophyton mentagrophytes* ATCC 9533 | 19 | 38 |
| *Trichophyton tonsurans* ATCC 10217 | 19 | 38 |
| *Rhizopus nigricans* ATCC 10404 | 38 | 38 |
| *Rhizopus oryzae* ATCC 10260 | 75 | *>100 |
| *Mucor* sp. | 75 | *>100 |
| *Penicillium chrysogenum* | 75 | 75 |
| *Sclerotinia sclerotiorum* ATCC 10939 | 38 | 38 |
| *Sclerotinia fructicola* ATCC 9962 | 9 | 38 |
| *Glomerella cingulata* ATCC 10534 | 38 | 75 |
| *Colletotrichum lagenarium* ATCC 11326 | 38 | 38 |
| *Cladosporium fulvum* ATCC 10391 | 75 | *>100 |
| *Physolospora rhodina* ATCC 10936 | 19 | 75 |
| *Diplodia zeae* ATCC 10235 | X | 19 |
| *Alternaria* sp. | 38 | ²>100 |
| *Alternaria solani* | 0.3 | 1.0 |
| *Venturia inequalis* (six-day incubation) | | 1.0 |
| (1) *Alternaria* sp. | 38 | ³75 |
| (1) *Bacillus subtilis* ATCC 10707 | ¹>100 | *>100 |
| (1) *Micrococcus pyogenes*, var. *aureus* ATCC 6538P | >100 | >100 |
| (1) *Mycobacterium smegmatis* ATCC 10143 | 75 | *>100 |
| (1) *Escherichia coli* ATCC 26 | >100 | *>100 |
| (1) *Proteus vulgaris* ATCC 6897 | ¹>100 | *>100 |

* Indicate incomplete but definite inhibition of growth at 100 mcg./ml.
² Incomplete but definite inhibition at 25 mcg./ml.
³ Incomplete but definite inhibition at 6 mcg./ml.

In order to determine the characteristics of the active antifungal agent of the present invention by paper chromatography, Pyrex-brand glass cylinders measuring six inches in diameter by 22½ inches in depth, inside dimensions, were lined with a sheet of filter paper covering about ½ of the circumference and ¾ of the depth with the edge resting against the bottom of the cylinder. The cylinder was fitted with a stainless steel lid having a rack underneath which was adjustable from the outside by means of a rod running through the center secured by an adjustable screw. A solvent having the composition: ethanol 70: deionized water 30 v./v.: 1.5 grams of sodium chloride, was placed in the bottom of the cylinder and poured over the filter paper lining. A cylindrical glass evaporating dish, five inches in diameter, was placed in the bottom of the cylinder and solvent of the same composition added to this dish.

Strips of Eaton-Dikeman filter paper #613, ⁵⁄₁₆ inch in width, were cut to proper length to hang inside the chromatography chamber by means of a loop formed in one end. These strips were then saturated with potassium phosphate buffer pH 7.0 and blotted with pressure between sheets of filter paper. Buffer composition:

Solution A:
  $KH_2PO_4$ _____ grams__ 10
  Deionized water _____ ml__ 100
Solution B:
  $K_2HPO_4$ _____ grams__ 10
  Deionized water _____ ml__ 100

Solution A was added to solution B in an amount sufficient to provide a pH of 7.0.

After drying the buffer saturated strips, solutions to be chromatographed were applied about one inch from the bottom of the strips. If more than 20 microliters were to be applied, it was done in successive stages with the paper allowed to dry between applications. Glass weights were attached to the bottom of the strips. After the strips were dried, they were hung in the chromatography cylinders with the bottom ends suspended above the solvent in the glass evaporating dish. The strips were allowed to equilibrate with the atmosphere of the cylinders for three hours, then were lowered into the solvent by moving the aforementioned adjustable rack. Development which was at 28° C. was allowed to proceed for 16 hours, the strips were removed, the solvent front or distance the solvent had migrated up the strip was marked and the strips were allowed to dry at room temperature. After drying, the strips were laid on large glass plates containing nutrient agar seeded with mycelial fragments of *Alternaria solani*. These plates were then incubated at 28° C. for 42–46 hours. Zones of inhibition of growth were present after incubation. The minor axis of these zones were marked as the distance traveled by the antifungal activity or activities. Locations were expressed numerically by Rf values or the ratio of distance traveled by the antibiotic from the midpoint of application to the distance traversed by the solvent from the same point.

The substances described in Example 11 showed zones of inhibition at Rf 0.05 and 0.25 with the 0.25 zone having the greater diameter.

The substance described in Example 12 showed zones of inhibition at Rf values of 0.05, 0.26, and 0.50 with the 0.26 zone having the largest diameter and the other two zones being approximately equal in diameter.

When the substances described in Example 11 and Example 12 were mixed in equal portions, the Rf values found were 0.04, 0.25, and 0.49 with the zone at Rf 0.25 having the largest diameter.

When 60 microliters of the supernate of the centrifugal fermentation beer described in Example 6 was applied to a paper strip and chromatographed in the above manner, zones of inhibition were found with Rf values of 0.06, 0.25, 0.50, with the 0.25 zone largest, the 0.06 zone next in size, and the 0.50 zone smallest.

The concentrated antifungal preparation which precipitated from the cooled butanol extracts in the foregoing Example 13 and assaying 36,000 agar dilution units per mg. was prepared as a potassium bromide pellet and the infrared spectrum thereof run on a Perkin-Elmer Model 21 double beam spectrophotometer. The following is a list of absorption bands characteristic of the preparation:

| Wave length (microns): | Wave number (cm.$^{-1}$) |
|---|---|
| 2.93 (strong) | 3413 |
| 3.40 (medium) | 2941 |
| 6.05 (strong) | 1653 |
| 6.20 (strong) | 1613 |
| 6.58 (weak) | 1520 |
| 8.10 (medium) | 1235 |
| 9.0 (strong) | 1111 |
| 9.3 (weak) | 1075 |
| 9.65 (weak) | 1036 |

The said concentrated antifungal preparation, when as an aqueous solution adjusted to a pH of 6.2 and 7.9 with standard phosphate buffer solutions, has an ultraviolet absorption maximum at 267 millimicrons. This maximum was unaffected by pH change from 6.2 to 7.9.

Hortesin is a water soluble acidic substance which is stable only in neutral or alkaline solution. Purified preparations have a half life of less than one hour at pH 4 at room temperature. It is most stable at slightly alkaline pH. Calcium, barium, and magnesium ions cause precipitation. The alkali metal salts are soluble. All preparations show the Folin-Ciocalteu test for phenols, the color corresponding to about 4%, expressed as tyrosine. All active preparations have U.V. absorption with a peak at about 270 millimicrons. The absorptivity $a=10-18$ for better preparations $$E_{1\,cm.}^{1\%} = 100-180$$

Vigorous acid hydrolysis yields uracil, but on less vigorous hydrolysis, cytidine and uridine can be identified by paper chromatography. This indicates that cytosine is the substance in intact Hortesin which is responsible for at least part of the U.V. absorption. Hydrolysis of Hortesin preparations obtained by the foregoing procedure in 1 N $H_2SO_4$ at 100° C. yields phosphorus as inorganic phosphate after ½ hour. Cytidylic acid under the same conditions yields very little inorganic phosphate. With enzymatic hydrolysis the phosphate is liberated readily from cytidylic acid but not from Hortesin.

Hortesin is non-dialyzable and the diffusion constant suggests a molecular weight of the order of 30,000. After mild acid hydrolysis the U.V. absorbing material becomes much more diffusible. Elementary analysis of Hortesin preparations indicate that Hortesin contains carbon, hydrogen, oxygen, nitrogen and small amounts of phosphorus and sulfur.

In the beer, the antifungal substance is destroyed in a few hours by weakly acidifying (pH 6.0). The half life of Hortesin is about one hour at pH 4 and is destroyed in 10-30 minutes at pH 3.0-4.0. A precipitate which forms at about pH 4.0 is inactive when redissolved in water by adjusting the pH to 7.0.

The concentrated or purified antifungal material, however, is much more stable to acid, although some destruction is evident. The activity can be precipitated at pH 3.0-5.0 from a water solution of material obtained by butanol extraction. This precipitate retains much of its activity when dissolved in water made slightly alkaline with sodium hydroxide.

The effect of heat on the stability of water solutions of the antifungal substance depends on the pH. The maximum stability to heat is observed at about pH 8.0, where there is only slight loss at 100° C. in 30 minutes. There is probably a significant loss at pH 10.0 at the same temperature in the same time interval, while total destruction occurs at pH 7.0 and below.

Quantitative solubility measurements of the antifungal material produced in Example 8 shows the active antifungal substance is very soluble in water, slightly soluble (1%) in methanol, and virtually insoluble (0.01%) in dry n-butanol and dry ethyl acetate. The antifungal substance from qualitative studies can be said to be insoluble in anhydrous ether, chloroform, and acetone, benzene and only very slightly esoluble in ethanol. Thus, Hortesin is found not to be extractable into non-polar organic solvents. Hortesin is extractable, however, into organic solvents which have the ability to dissolve considerable water.

A detailed disclosure of several useful compositions prepared with the antifungal agent of the present invention and methods of using said compositions are set forth in the application for United States Letters Patent filed concurrently herewith by Richard H. Gruenhagen.

The present application is a continuation-in-part of our co-pending application Serial No. 759,440, filed September 8, 1958, and now abandoned which in turn was a continuation-in-part of our co-pending application Serial No. 594,362, filed June 28, 1956, and now abandoned.

Others may readily adapt the invention for use under various conditions of service, by employing one or more of the novel features disclosed or equivalents thereof, As as present advised with respect to the apparent scope of our invention, we desire to claim the following subject matter.

We claim:

1. A process of producing a composition of matter having antifungal activity which comprises cultivating the microorganism Streptomyces versipellis NRRL 2528 in an aqueous nutrient medium containing an assimilable source of carbon, nitrogen, and essential trace minerals under submerged aerobic conditions until antifungal activity is imparted to the said solution.

2. A process as described in claim 1 wherein Streptomyces versipellis NRRL 2528 is cultivated in the specified manner at a temperature between about 24° C. and 37° C.

3. A process as described in claim 2 wherein Streptomyces versipellis NRRL 2528 is cultivated in the specified manner in a nutrient medium containing dextrin, soybean meal, and corn steep solids.

4. A process as described in claim 2 wherein Streptomyces versipellis NRRL 2528 is cultivated in the specified manner at a temperature of about 32° C. for a period of about three days.

5. A process of preparing a composition of matter having antifungal activity which comprises filtering the fermentation medium obtained by cultivating Streptomyces versipellis NRRL 2528 in an aqueous nutrient medium containing an assimilable source of carbon, nitrogen, and essential trace minerals under deep culture fermentation conditions until antifungal activity is imparted to the fermentation medium and thereafter removing water from the filtrate.

6. A process of preparing a composition of matter having antifungal activity which comprises filtering the fermentation medium obtained by cultivating Streptomyces versipellis NRRL 2528 in an aqueous nutrient medium containing an assimilable source of carbon, nitrogen and essential trace minerals under deep culture fermentation conditions until antifungal activity is imparted to the fermentation medium, extracting the resulting filtrate with butanol, thereafter concentrating the butanol extract under vacuum to remove water, precipitating the said composition of matter from the concentrated butanol extract, and recovering the precipitate free of butanol.

7. A process of preparing a composition of matter having antifungal activity which comprises filtering the fermentation medium obtained by cultivating Streptomyces versipellis NRRL 2528 in an aqueous nutrient medium containing an assimilable source of carbon, nitrogen, and essential trace minerals under deep culture fermentation conditions until antifungal activity is imparted to the fermentation medium to recover the mycelium, extracting the mycelium with hot aqueous butanol, removing the butanol from the butanol extract by distillation under reduced pressure, and thereafter lyophilizing the concentrated solution to produce a composition of matter having antifungal activity.

8. A process of preparing a composition of matter having antifungal activity which comprises filtering the fermentation medium obtained by cultivating *Streptomyces versipellis* NRRL 2528 in an aqueous nutrient medium containing an assimilable source of carbon, nitrogen and essential trace minerals under deep culture fermentation conditions until antifungal activity is imparted to the fermentation medium to recover the mycelium, extracting the mycelium with hot aqueous acetone, concentrating the acetone extract under vacuum to about one-sixth its original volume, extracting the latter concentrated solution with n-butanol, precipitating the said composition from the butanol solution, and recovering the solid composition of matter having antifungal activity free of butanol.

References Cited in the file of this patent

Pridham et al.: Applied Microbiology, vol. 6, No. 1, pp. 52–79, January 1958, citation of Gauze, 1957, Problems of Classification of Actinomycetes Antagonists, National Press of Medical Literature, Medzig, Moscow, USSR, pp. 164 and 166.